US012755340B2

(12) United States Patent
Maekelae et al.

(10) Patent No.: US 12,755,340 B2
(45) Date of Patent: Oct. 6, 2026

(54) TONE MAPPING VIA DYNAMIC HISTOGRAM MATCHING

(71) Applicant: MICROSOFT TECHNOLOGY LICENSING, LLC, Redmond, WA (US)

(72) Inventors: Christian Markus Maekelae, Redmond, WA (US); Michael Bleyer, Seattle, WA (US); Christopher Douglas Edmonds, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 562 days.

(21) Appl. No.: 18/325,437

(22) Filed: May 30, 2023

(65) Prior Publication Data

US 2024/0404011 A1 Dec. 5, 2024

(51) Int. Cl.

| | |
|---|---|
| ***G06T 5/40*** | (2006.01) |
| ***G06T 5/00*** | (2024.01) |
| ***G06T 5/10*** | (2006.01) |
| ***G06T 5/50*** | (2006.01) |
| ***G06T 5/70*** | (2024.01) |

(52) U.S. Cl.

CPC .................. *G06T 5/40* (2013.01); *G06T 5/10* (2013.01); *G06T 5/50* (2013.01); *G06T 5/70* (2024.01)

(58) Field of Classification Search

CPC .... G06T 5/40; G06T 5/70; G06T 5/10; G06T 5/50

See application file for complete search history.

(56) References Cited

U.S. PATENT DOCUMENTS

| | | | | |
|---|---|---|---|---|
| 7,003,153 | B1 | 2/2006 | Kerofsky | |
| 9,418,408 | B1 | 8/2016 | Thompson | |
| 2012/0250988 | A1* | 10/2012 | Peng | G06T 5/40 382/165 |
| 2015/0287174 | A1 | 10/2015 | St. Romain, II | |
| 2019/0333193 | A1* | 10/2019 | Kozub | G06T 5/20 |

FOREIGN PATENT DOCUMENTS

| | | | |
|---|---|---|---|
| WO | 2016113407 | A1 | 7/2016 |

OTHER PUBLICATIONS

NPL: IP.com and IEEE, Results Publication Date Range: Aug. 14, 2003 to Aug. 15, 2025.*

NPL: InnovationQ+ by IP.com and IEEE: Results Publication Date Range: Jun. 25, 2009 to Feb. 11, 2026.*

International Search Report and Written Opinion received for PCT Application No. PCT/US2024/030507, mailed on Sep. 25, 2024, 14 pages.

International Preliminary Report on Patentability (Chapter I) received for PCT Application No. PCT/US2024/030507, mailed on Dec. 11, 2025, 08 pages.

* cited by examiner

*Primary Examiner* — Quang N Vo

(74) *Attorney, Agent, or Firm* — Workman Nydegger

(57) ABSTRACT

A system for facilitating tone mapping is configurable to (i) generate an input image histogram based on one or more input images, the input image histogram comprising a plurality of bins, wherein each bin of the plurality of bins is associated with one or more pixel values and indicates a quantity of pixels that comprise the one or more pixel values; (ii) generate a target histogram based at least on the input image histogram; and (iii) generate an output image by using the target histogram to map pixel values of at least one of the one or more input images to corresponding pixel values in the output image.

12 Claims, 8 Drawing Sheets

400

600

TONE MAPPING VIA DYNAMIC HISTOGRAM MATCHING

BACKGROUND

Mixed-reality (MR) systems, including virtual-reality and augmented-reality systems, have received significant attention because of their ability to create truly unique experiences for their users. For reference, conventional virtual reality (VR) systems create a completely immersive experience by restricting their users' views to only a virtual environment. This is often achieved, in VR systems, through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects placed in or interacting with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

Some MR systems include one or more cameras and utilize images and/or depth information obtained using the camera(s) to provide pass-through views of a user's environment to the user. A pass-through view can aid users in avoiding disorientation and/or safety hazards when transitioning into and/or navigating within a mixed-reality environment. Pass-through views may also enhance user views in low-visibility environments. For example, mixed-reality systems configured with long-wavelength thermal imaging cameras may facilitate visibility in smoke, haze, fog, and/or dust. Likewise, mixed-reality systems configured with low-light imaging cameras facilitate visibility in dark environments where the ambient light level is below the level required for human vision.

An MR system may provide pass-through views in various ways. For example, an MR system may present raw images captured by the camera(s) of the MR system to a user. In other instances, an MR system may modify and/or reproject captured image data to correspond to the perspective of a user's eye to generate pass-through views. An MR system may modify and/or reproject captured image data to generate a pass-through view using depth information for the captured environment obtained by the MR system (e.g., using a depth system of the MR system, such as a time of flight camera, a rangefinder, stereoscopic depth cameras, etc.). In some instances, an MR system utilizes one or more predefined depth values to generate pass-through views (e.g., by performing planar reprojection).

In some instances, pass-through views generated by modifying and/or reprojecting captured image data may at least partially correct for differences in perspective brought about by the physical separation between a user's eyes and the camera(s) of the MR system (known as the "parallax problem," "parallax error," or, simply "parallax"). Such pass-through views/images may be referred to as "parallax-corrected pass-through" views/images. By way of illustration, parallax-corrected pass-through images may appear to a user as though they were captured by cameras that are co-located with the user's eyes.

Pass-through imaging can provide various beneficial user experiences, such as enabling users to perceive their surroundings in situations where ordinary human perception is limited. For instance, an MR system may be equipped with thermal cameras and be configured to provide pass-through thermal imaging, which may enable users to perceive objects in their environment even when smoke or fog is present. As another example, an MR system may be equipped with low light cameras and be configured to provide pass-through low light imaging, which may enable users to perceive objects in dark environments.

The subject matter claimed herein is not limited to embodiments that operate only in environments such as those described above. Rather, this background is only provided to illustrate one example technology area where some embodiments described herein may be practiced.

BRIEF DESCRIPTION OF THE DRAWINGS

To describe how the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail through the use of the accompanying drawings in which.

DETAILED DESCRIPTION

Figure 1:
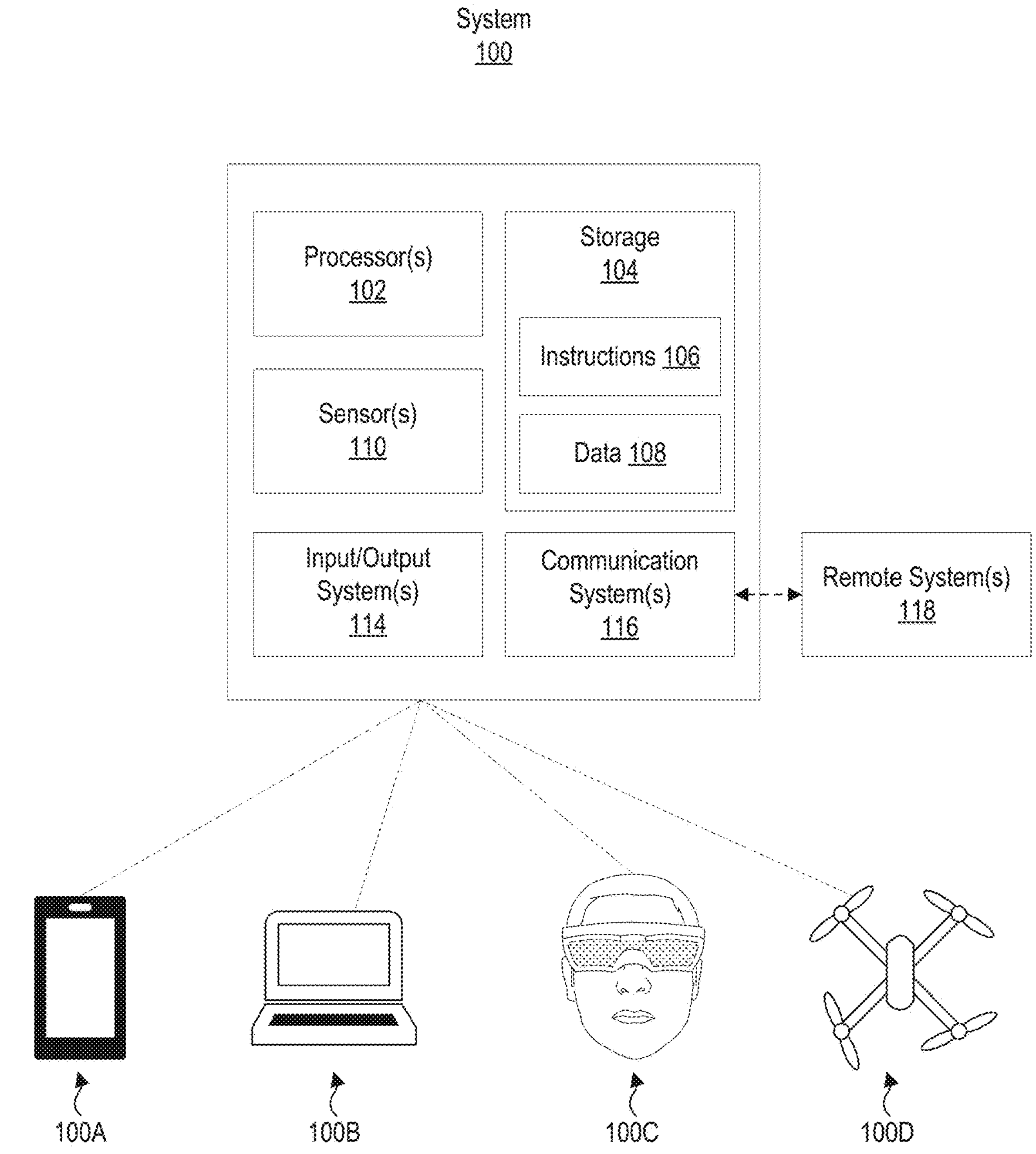
FIG. 1 illustrates example components of an example system that may include or be used to implement one or more disclosed embodiments.

Disclosed embodiments are generally directed to systems, methods, and apparatuses for facilitating tone mapping via dynamic histogram matching.

Examples of Technical Benefits, Improvements, and Practical Applications

As noted above, MR systems may capture images for various purposes, such as to provide pass-through experiences where images of a user's environment are captured and reprojected and/or otherwise transformed and presented to the user. In some instances, users operate MR systems in environments (e.g., low light environments) where captured imagery lacks sufficient contrast to enable users to adequately interpret details of their environment.

Tone mapping is a process of remapping image pixel values. By way of non-limiting example, for an 8-bit image, pixel intensities $I \in \{0, \ldots, 255\}$ of an input image may be mapped to new pixel intensities $I \in \{0, \ldots, 255\}$ in an output image. In global tone mapping, the mapping of pixel intensities is constant for all pixels, whereas, in local tone mapping, the mapping of pixel intensities is spatially varying.

Tone mapping can be performed to transform the tonal range (e.g., range of brightness values) of an image to improve visual appeal, image interpretability, and/or usability for particular displays or media. In some instances, tone mapping can reveal details to observers that are not visible in original imagery (e.g., due to lack of contrast). Histogram equalization is one example tone mapping technique, where a mapping for an input image is computed to cause the distribution of intensities in an output image to be substantially uniform. For instance, histogram equalization may cause an output image to have an image histogram where each of the bins have a substantially equal count or height.

In some instances, such as when imaging under low light conditions, performing histogram equalization (whether global or local) on imagery captured by an MR system can result in boosted image noise and/or changes to image statistics that cause the output image to appear unrealistic or unnatural.

At least some disclosed embodiments are directed to tone mapping techniques that utilize dynamic histogram matching. Tone mapping performed in accordance with the present disclosure may generate an output image with an image histogram that is matched to a target histogram. The target histogram can be dynamically generated based on input imagery, in contrast with conventional histogram equalization techniques where the target histogram is hardcoded and/or pre-defined.

In some implementations, a system determines an input image histogram of an input image and generates a target histogram based on the input image histogram. The target histogram may be generated in a manner that substantially avoids sharp peaks (e.g., where a small number of consecutive bins have high counts). For instance, a system may generate a target histogram from an input image histogram by applying a smoothing operation to the input image histogram. Various types of smoothing operations may be applied, such as Gaussian blur or an approximation thereof (e.g., box filtering).

In some instances, by applying a smoothing operation, peaks that exist in the input image histogram may be at least partially spread out in the target histogram to provide, in the target histogram, a larger quantity of consecutive bins with lower counts (which can increase contrast in output imagery formed using the target histogram). The target histogram may be generated in a manner that mitigates drastic changes to the general shape and/or appearance of peaks that existed in the input image histogram, which can contribute to preserving a natural and/or realistic appearance in output imagery formed using the target histogram).

The target histogram may be utilized to generate a mapping that may be applied to the pixel values of the input image to obtain the pixel values for the output image. For instance, histogram matching may be performed using the target histogram to transform the input image into an output image, where the output image has an image histogram that is matched to the target histogram. The output image may comprise a tone-mapped image that may be used for various purposes, such as for display to users and/or computer vision tasks (one will appreciate that additional post-processing may be performed on a tone-mapped image).

By performing tone mapping (e.g., via histogram matching) utilizing a target histogram that is dynamically generated based upon an input image on which the tone mapping is to be performed, disclosed embodiments can provide output imagery that depicts scene content with greater detail and/or with greater interpretability than unmapped imagery. Such functionality may be especially beneficial for images captured in low-contrast implementations (e.g., low-light or high-light conditions).

Although the examples discussed herein focus, in at least some respects, on performing tone mapping on images captured by an HMD in a mixed reality context, the principles discussed herein can be applied to images captured by any device in any context. Furthermore, although the examples discussed herein focus, in at least some respects, on performing tone mapping to improve image interpretability of low-contrast scenes, the principles discussed herein may be applied to perform tone mapping for various purposes, such as to stylize images and/or emphasize different image aspects/characteristics. The principles discussed herein may be applied to various types of images, such as color images, grayscale images, etc. For instance, different tone mapping operations may be performed for different color bands or color channels of the same input image, and the tone mapping results for the different color bands may be combined to provide the final output image.

Example Systems and Components

FIG. 1 illustrates various example components of a system 100 that may be used to implement one or more disclosed embodiments. For example, FIG. 1 illustrates that a system 100 may include processor(s) 102, storage 104, sensor(s) 110, input/output system(s) 114 (I/O system(s) 114), and communication system(s) 116. Although FIG. 1 illustrates a system 100 as including particular components, one will appreciate, in view of the present disclosure, that a system 100 may comprise any number of additional or alternative components.

The processor(s) 102 may comprise one or more sets of electronic circuitries that include any number of logic units, registers, and/or control units to facilitate the execution of computer-readable instructions (e.g., instructions that form a computer program). Such computer-readable instructions may be stored within storage 104. The storage 104 may comprise a computer-readable recording medium and may be volatile, non-volatile, or some combination thereof. Furthermore, storage 104 may comprise local storage, remote storage (e.g., accessible via communication system(s) 116 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 102 may be configured to execute instructions 106 stored within storage 104 to perform certain actions. The actions may rely at least in part on data 108 stored on storage 104 in a volatile or non-volatile manner.

In some instances, the actions may rely at least in part on communication system(s) 116 for receiving data from remote system(s) 118, which may include, for example, separate systems or computing devices, sensors, and/or others. The communications system(s) 116 may comprise any combination of software or hardware components that are operable to facilitate communication between on-system components/devices and/or with off-system components/devices. For example, the communications system(s) 116 may comprise ports, buses, or other physical connection apparatuses for communicating with other devices/components. Additionally, or alternatively, the communications system(s) 116 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system 100 may comprise or be in communication with sensor(s) 110. Sensor(s) 110 may comprise any device for capturing or measuring data representative of perceivable or detectable phenomenon. By way of non-limiting example, the sensor(s) 110 may comprise one or more radar sensors (as will be described in more detail hereinbelow), image sensors, microphones, thermometers, barometers, magnetometers, accelerometers, gyroscopes, and/or others.

Furthermore, FIG. 1 illustrates that a system 100 may comprise or be in communication with I/O system(s) 114. I/O system(s) 114 may include any type of input or output device such as, by way of non-limiting example, a touch screen, a mouse, a keyboard, a controller, and/or others, without limitation. For example, the I/O system(s) 114 may include a display system that may comprise any number of display panels, optics, laser scanning display assemblies, and/or other components.

FIG. 1 conceptually represents that the components of the system 100 may comprise or utilize various types of devices, such as mobile electronic device 100A (e.g., a smartphone), personal computing device 100B (e.g., a laptop), a mixed-reality head-mounted display 100C (HMD 100C), an aerial vehicle 100D (e.g., a drone), other devices (e.g., self-driving vehicles), combinations thereof, etc. A system 100 may take on other forms in accordance with the present disclosure.

Tone Mapping Via Dynamic Histogram Matching

Figure 2A:
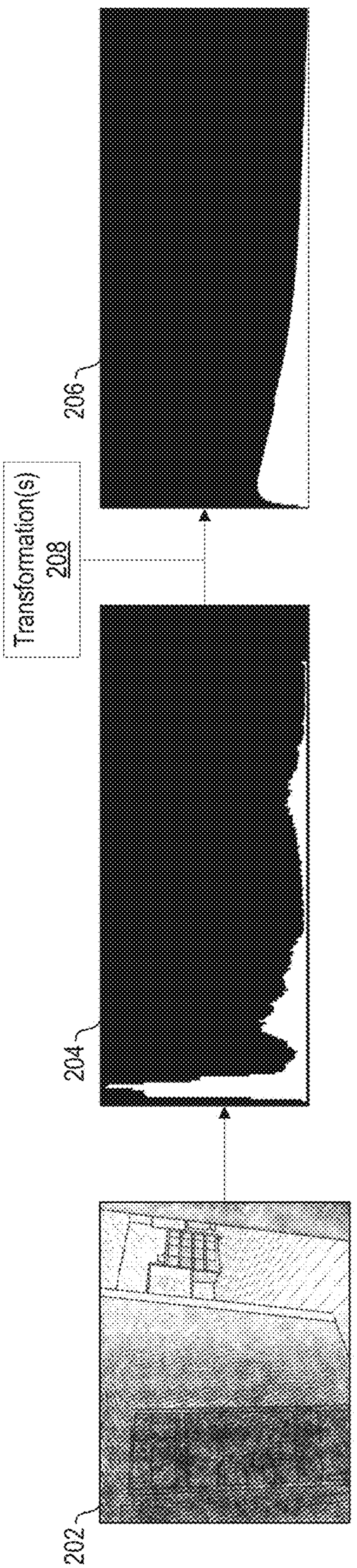
FIG. 2A illustrates a conceptual representation of an input image, an input image histogram, and a target histogram generated based on the input image histogram.
Figure 2B:
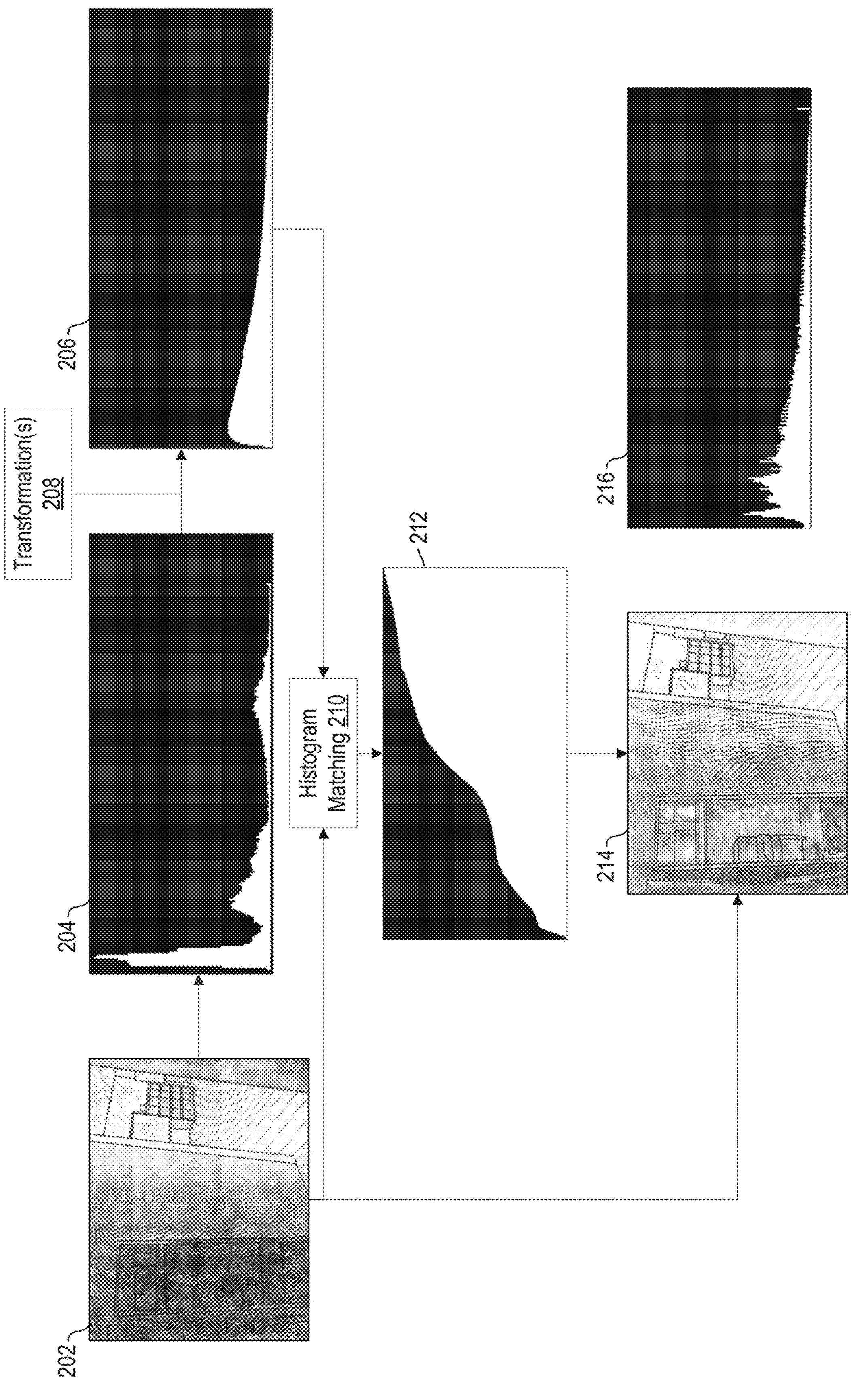
FIG. 2B illustrates a conceptual representation of using the target histogram and the input image of FIG. 2A to generate an output image.
Figure 2C:
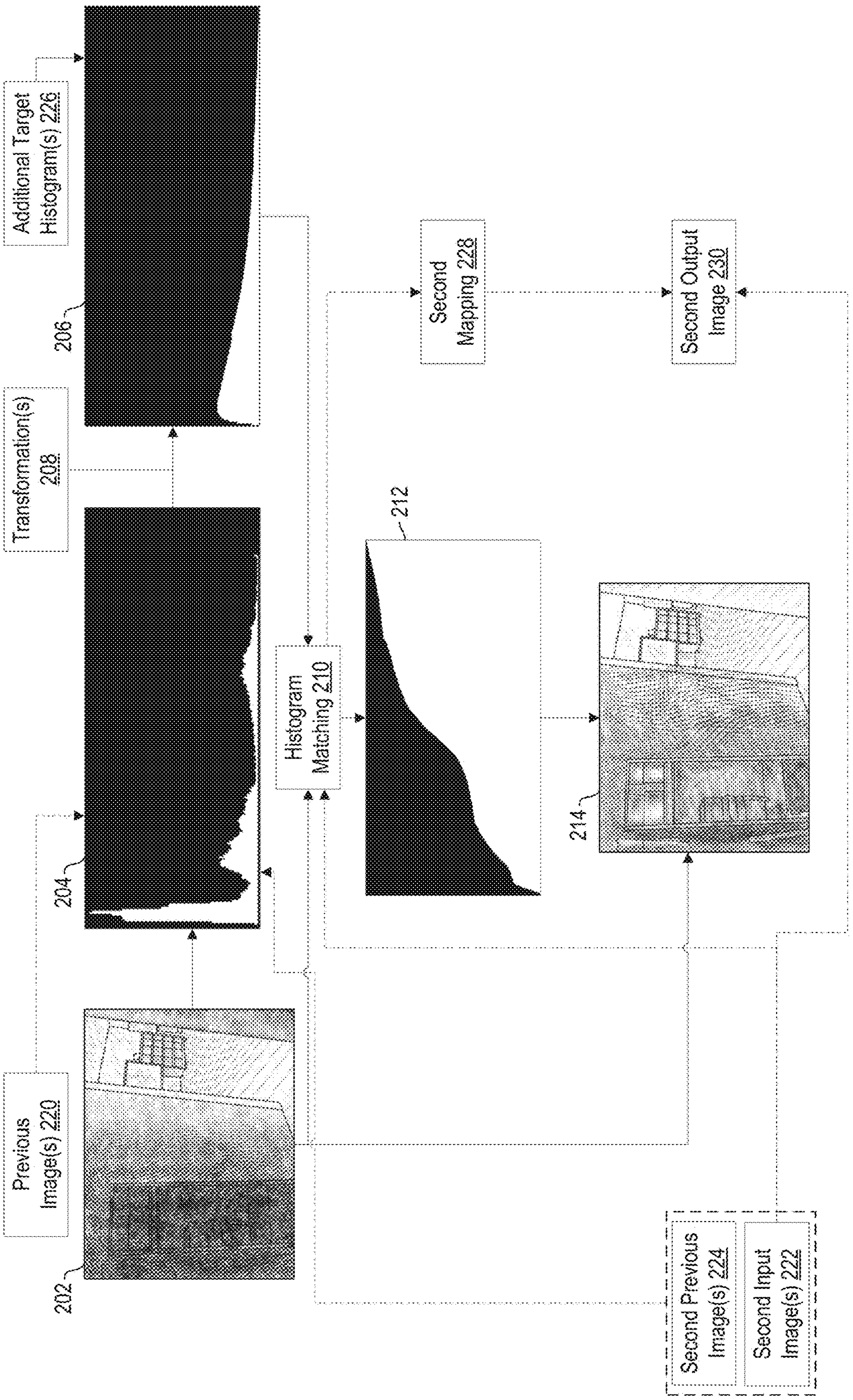
FIG. 2C illustrates a conceptual representation of utilizing multiple input images to form an input image histogram, utilizing multiple histograms to generate a target histogram, and generating multiple output images using the same target histograms.
Figure 3:
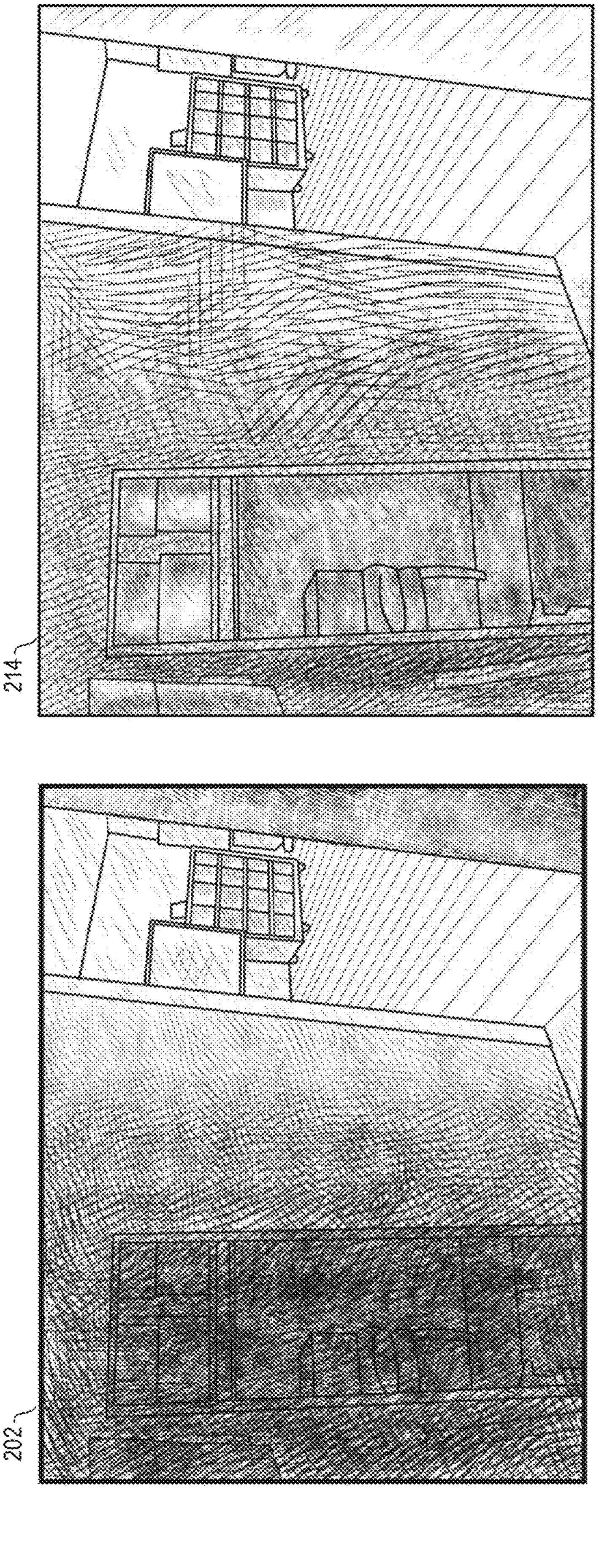
FIG. 3 provides an enlarged view of the input image and the output image of FIGS. 2A, 2B, and 2C.

FIG. 2A illustrates a conceptual representation of an input image 202, which may be captured by one or more image sensors (e.g., sensor(s) 110) of a system (e.g., system 100). For clarity, FIG. 3 provides an enlarged view of the input image 202. In the example of FIG. 2A (and FIG. 3), the input image 202 captures a scene that includes a low-light region (on the left) and an illuminated region (on the right). As is evident from FIG. 2A (and FIG. 3), input image 202 suffers from a lack of contrast in the low-light region, which can make it difficult for users to interpret details and/or aspects of the environment represented in the input image 202. FIGS. 2A, 2B, and 2C depict aspects of techniques for performing tone mapping via dynamic histogram matching that can be used to generate an output image (e.g., output image 214, as shown in FIG. 3) with improved contrast (relative to the input image 202). The operations discussed with reference to FIGS. 2A, 2B, and 2C may be performed by one or more components of one or more systems (e.g., system 100 and/or remote system(s) 118).

FIG. 2A depicts an input image histogram 204, which a system may generate based on the input image 202. The input image histogram 204 of FIG. 2A depicts pixel bins horizontally (e.g., as coordinates along an x-axis or horizontal axis) and depicts the quantity of pixels within each bin via vertical bars associated with each bin (e.g., extending along a y-axis or vertical axis). In the example of FIG. 2A, each bin of the input image histogram 204 is associated with one or more respective pixel values, and the height of the bar associated with each bin indicates the quantity of pixels in the input image 202 that comprise the one or more respective pixel values. For example, where the input image 202 comprises an 8-bit image with 256 possible pixel values, the input image histogram 204 may comprise 256 bins each representing different possible pixel values, and the bars associated with each bin may represent the quantity of pixels that have the different pixel values.

In the example of FIG. 2A, the bins of the input image histogram 204 are arranged in ascending order from left to right, with low pixel value bins on the left and high pixel value bins on the right. As is evident from FIG. 2A, the input image histogram 204 includes a peak among the low pixel value bins, where a set of adjacent low pixel value bins have a high quantity of pixels relative to other sets of adjacent bins in the input image histogram 204. Peaks in image histograms can indicate low contrast in the imagery from which the image histogram is derived. Although existing methods (e.g., histogram equalization) may be performed to level such peaks to improve contrast in output imagery, such techniques can fail to preserve characteristics of the input images and can cause increases in image noise. Accordingly, at least some disclosed embodiments utilize the input image histogram 204 itself as a basis for determining a target histogram that can be used to perform tone mapping on the input image 202, which can contribute to preserving characteristics of the original input image 202 while mitigating the introduction of image noise.

FIG. 2A conceptually depicts generating a target histogram 206 based upon the input image histogram 204. In particular, FIG. 2A depicts generating the target histogram 206 by applying one or more transformations 208 to the input image histogram 204. The transformation(s) 208 may cause the target histogram 206 to have a modified distribution of pixels within the bins thereof (relative to the distribution of the input image histogram 204).

The transformation(s) 208 may implement various types of operations (e.g., 1-dimensional filtering operations), and different types of operations may be applied in different contexts. In the example of FIG. 2A, the transformation(s) 208 comprise one or more smoothing operations, such as, by way of non-limiting example, a Gaussian blur operation that convolves the input image histogram 204 with a Gaussian kernel to provide the target histogram 206, or a box filter operation (e.g., iterative box filtering) that convolves the input image histogram 204 with a box filter kernel (e.g., an averaging kernel) to provide the target histogram 206. In some implementations, the transformation(s) 208 applied to obtain the target histogram 206 may determine pixel quantities for bins of the target histogram 206 by obtaining weighted combinations of pixel quantities of neighboring bins in the input image histogram 204 (e.g., giving lesser weight to pixel quantities for spatially distant bins).

As is evident from FIG. 2A, the target histogram 206 mitigates the peak present in the low pixel value bins of the input image histogram 204, while still preserving aspects of the general shape of the distribution represented in the input image histogram 204. For instance, the target histogram 206 has a right-skewed distribution of pixel values, with the peak of the input image histogram 204 being spread out with a lower amplitude in the target histogram 206.

The transformation(s) 208 may comprise configurable aspects or parameters that can influence the generation of the target histogram 206 based on the input image histogram 204. For instance, where the transformation(s) 208 implement smoothing operations, the standard deviation of the Gaussian kernel or the width of the box filter kernel (e.g., 50 bins) may be selected or selectively modified to achieve desired smoothing characteristics (e.g., a greater standard deviation or wider box filter kernel can be associated with a higher amount of smoothing). In some implementations, one or more configurable aspects or parameters of the transformation(s) 208 are determined based on characteristics of the input image histogram 204. For example, a system may utilize the quantity of peaks, the amplitude of the highest peak(s), and/or the shape or evenness of the pixel value distribution in the input image histogram 204 to determine kernel width and/or other aspects for the transformation(s) 208.

In some instances, transformation(s) are applied differently to different portions or bin positions of the input image histogram 204 to generate the target histogram 206 (e.g., in a spatially varying manner). In some implementations, parameters or other aspects of the transformation(s) 208 (e.g., kernel width, kernel positioning relative to target bin, standard deviation) may be determined based on bin position. For instance, transformation(s) 208 that implement smoothing may be configured to modify kernel size or standard deviation based on the distance of the target bin (e.g., the bin for which pixel quantity is being determined) from one or more histogram boundaries (e.g., the lowest and highest bins). For example, the kernel size for a smoothing operation may be reduced for target bins that are proximate to a histogram boundary (e.g., a target bin at the boundary may have a kernel size of 1).

As another example, different parameters or other aspects of the transformation(s) 208 may be selected for different pixel values associated with different bins. For instance, different kernel widths may be applied for different target bins associated with different pixel brightness values (e.g., a larger kernel may be defined for brighter pixel values or darker pixel values to achieve greater contrast in such regions in output imagery generated using the target histogram 206). In some instances, implementing spatially varying parameters of the transformation(s) 208 may contribute to reduced distortion in dark or bright regions of output imagery generated using the target histogram 204.

Although the target histogram 206 of FIG. 2A is achieved by applying transformation(s) 208 in the form of smoothing to the input image histogram 204, other types of transformations for other purposes may be utilized in accordance with the present disclosure. For instance, transformation(s) 208 that achieve sharpening, offsetting, or other modifications of peaks in the input image histogram 204 may be utilized to generate a target histogram (e.g., to achieve cartoonization, stylization, or other effects in output imagery generated using the target histogram).

As indicated above, the target histogram 206 may be utilized to generate an output image. For instance, the target histogram 206 may be utilized to map pixel values of the input image 202 to corresponding pixel values for the output image.

FIG. 2B illustrates a conceptual representation of using the target histogram 206 and the input image 202 to generate an output image 214. In the example of FIG. 2B, the output image 214 is obtained by performing histogram matching 210 using the target histogram 206 and the input image 202. In some implementations, histogram matching 210 includes generating a cumulative distribution function based on the input image 202 (e.g., using the input image histogram 204) and a cumulative distribution function based on the target histogram 206. The cumulative distribution functions may then be used to generate a mapping that can be used to map pixel values of the input image 202 to corresponding pixel values for the output image 214.

FIG. 2B conceptually depicts a mapping 212 generated via histogram matching 210. In the example mapping 212 of FIG. 2B, the horizontal or x-axis represents pixel values in the input image 202, and the vertical or y-axis represents corresponding pixel values for the output image 214. Accordingly, the mapping 212 may effectively be used as a lookup table for which each pixel value of the input image 202 may be mapped to a corresponding pixel value for the output image 214. In the example of FIG. 2B, the mapping 212 is generally configured to boost low pixel values (e.g., smaller than 20 for 8-bit imagery) and dampen high pixel values.

As is evident from FIG. 2B (and from FIG. 3), the output image obtained via histogram matching 210 using the target histogram 206 dynamically generated based on the input image 202 provides greater contrast (and therefore greater image interpretability for users) in regions of the input image 202 that suffered from low contrast. FIG. 2B depicts an output image histogram 216 that is similar to the dynamically generated target histogram 206 used to obtain the output image 214.

Although the examples discussed with reference to FIGS. 2A and 2B utilize a single input image 202 to generate a single input image histogram 204, utilize a single input image histogram 204 to generate a single target histogram 206, and generate a single output image 214, other configurations are within the scope of the present disclosure. For instance, FIG. 2C illustrates previous image(s) 220, which may be utilized as an input for generating the input image histogram 204. The previous image(s) 220 may be associated with a timepoint that temporally precedes the timepoint of the input image 202. For example, the previous image(s) 220 may comprise a previously captured image or an output image generated by a previous filtering or image processing operation (e.g., a previous tone mapping operation, as described herein). In some instances, image histograms of both the input image 202 and the previous image(s) 220 are combined (e.g., by averaging) to form the input image histogram 204 that is utilized to generate the target histogram 206. In some instances, multiple input image histograms associated with different input images are utilized as inputs for generating a target histogram 206 (e.g., by incorporating a kernel in the transformation(s) 208 that includes multiple dimensions to implement data from multiple input image histograms).

In some instances, the input image 202 and the previous image(s) 220 are acquired by or determined based on imagery captured by a single image sensor. In some implementations, imagery from multiple image sensors is utilized in tone mapping as described herein. For instance, in some implementations, imagery from multiple image sensors is utilized for computer vision and/or image processing tasks, such as stereo matching, stereoscopic display output generation, feature matching, image alignment, and/or others. Tone mapping as disclosed herein may be implemented in a manner that utilizes multiple images associated with different image sensors to generate multiple output images that are tone mapped using the same (or a substantially similar) target histogram. Such functionality may contribute to similarity in appearance in multiple output images, which can improve computer vision and/or image processing results.

For example, FIG. 2C illustrates second input image(s) 222 and second previous image(s) 224, which may be associated with a different image sensor than the input image 202 and/or the previous image(s) 220. In some implementations, the second input image(s) 222 and/or the second previous image(s) 224 are utilized in conjunction with the input image 202 and/or the previous image(s) 220 to generate the input image histogram 204 (or their image histograms are utilized directly to generate the target histogram 206). In some instances, the second input image(s) 222 and/or the second previous image(s) 224 may be utilized in combination with the input image 202 in a manner similar to the previous image(s) 220 discussed above.

As noted above, the target histogram 206 may be generated by applying transformation(s) 208 to the input image histogram 204 (which may be based on multiple image histograms associated with multiple images) and/or to multiple input image histograms (associated with different images). FIG. 2C furthermore illustrates that the target histogram may be generated based on additional target histogram(s) 226. For instance, different target histograms may be generated based on different sets of input image histograms (e.g., associated with different image sensors), and the different target histograms may be combined to form a final target histogram to be used to generate the output image 214.

As another example, a current target histogram may be generated based on an input image histogram associated with a current timepoint, and a previous target histogram associated with a previous timepoint may be combined with the current target histogram to obtain a final target histogram to be used to generate the output image 214. In some implementations, a final target histogram is utilized as a previous histogram for a subsequent iteration of generating an output image. In some instances, recursively generating final target histograms based on current and previous target histograms (e.g., in the manner of an infinite impulse response filter) can advantageously mitigate abrupt changes to target histograms that could result in abrupt changes in temporally consecutive output images (which could be distracting for users).

FIG. 2C also conceptually depicts that multiple output images may be generated based on a single target histogram. For instance, FIG. 2C depicts a dashed arrow extending from the second input image(s) 222 (which may be used as a basis for the input image histogram 204 and/or the target histogram 206) to histogram matching 210, indicating that histogram matching 210 may be performed using the target histogram 206 and the second input image(s) 222 to generate a second mapping 228 (conceptually similar to mapping 212). FIG. 2C also depicts (via dashed arrows) the second mapping 228 being used to map pixels of the second input image(s) 222 to generate a second output image 230. Accordingly, the target histogram 206 may be used to generate different output images 214 and 230. As noted above, such functionality may contribute to similarity in appearance in the different output images, which can improve computer vision and/or image processing results.

The operations and/or functions discussed herein with reference to FIGS. 2A, 2B, and 2C may be performed in any suitable computational environment, which may include one or more systems (e.g., comprising one or more components of system 100). In one example, a system (e.g., an HMD) configured to facilitate tone mapping via dynamic histogram matching as discussed with reference to FIGS. 2A, 2B, and 2C includes one or more image sensors configured to capture one or more input images. The system may further comprise one or more processors and one or more computer-readable recording media to process the input image(s) to obtain one or more target histograms and one or more output images. The system may include one or more displays configured to present display imagery generated based on output imagery obtained by performing tone mapping via dynamic histogram matching.

In some implementations, a system configured to facilitate tone mapping via dynamic histogram matching as discussed with reference to FIGS. 2A, 2B, and 2C is configured to access a target histogram (e.g., generated by another system) and use the target histogram (and one or more input images) to generate one or more mappings usable to generate output imagery as discussed above. The system may then apply the mapping to generate output imagery or convey the mapping to a separate system to enable the separate system to generate the output imagery.

In some implementations, a system configured to facilitate tone mapping via dynamic histogram matching as discussed with reference to FIGS. 2A, 2B, and 2C is configured to obtain a mapping usable to generate output imagery as discussed above. In some instances, the system receives the mapping from a remote system. The system may comprise one or more image sensors that capture images, and the system may send the images (or image histograms based thereupon) to the remote system to facilitate generation of the mapping at the remote system. The system may then use the mapping to generate output imagery. In some instances, the system comprises one or more displays to present display imagery generated based on the output imagery.

Example Method(s)

The following discussion now refers to a number of methods and method acts that may be performed in accordance with the present disclosure. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

Figure 4:
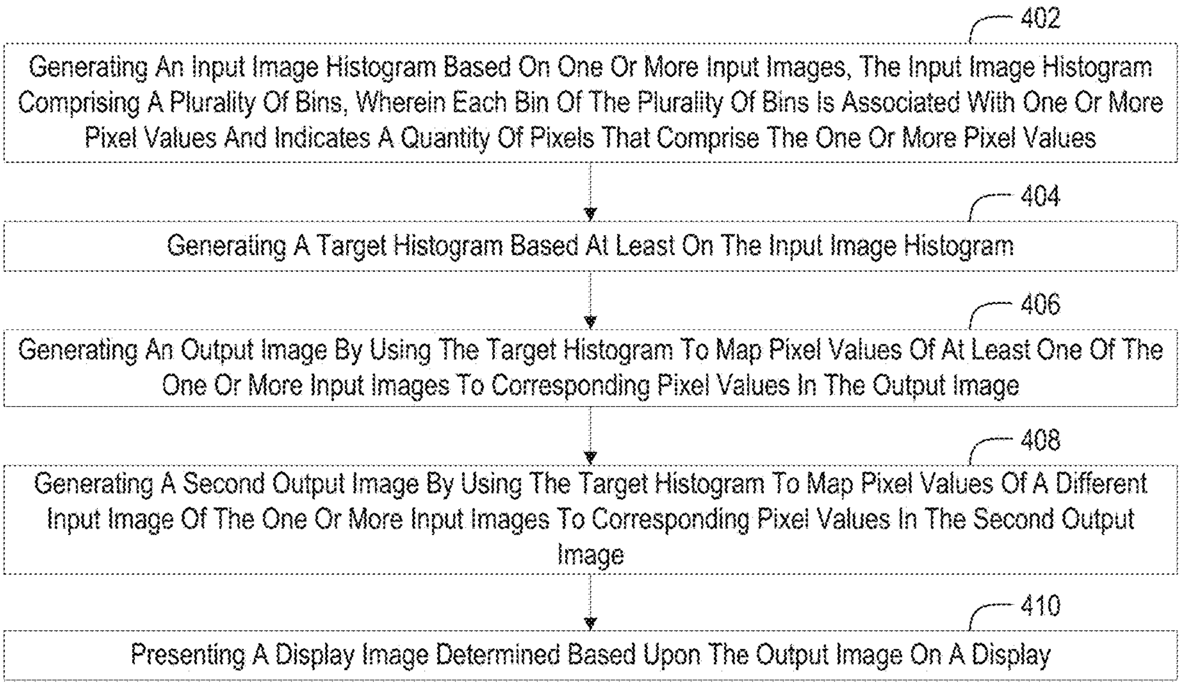
FIGS. 4, 5, and 6 illustrate example flow diagrams depicting acts associated with facilitating tone mapping via dynamic histogram matching, in accordance with implementations of the present disclosure.
Figure 5:
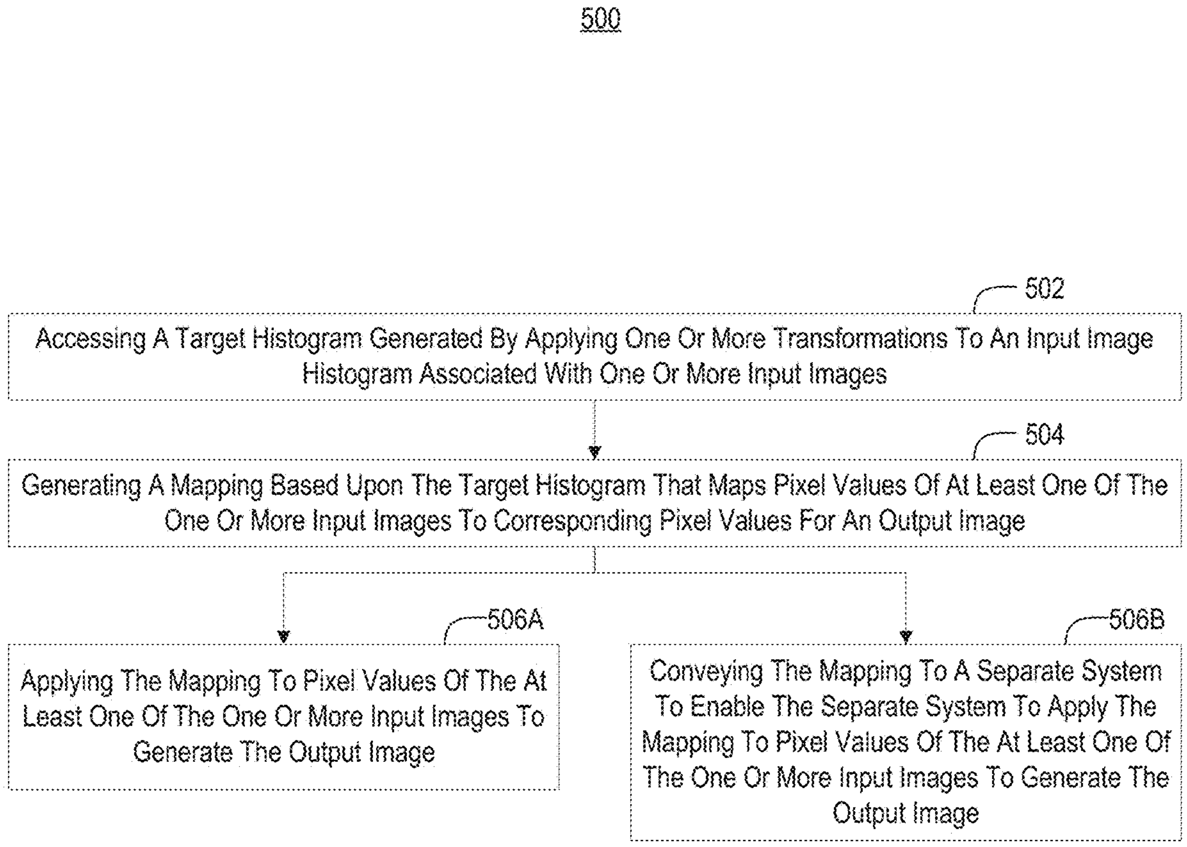
Figure 6:
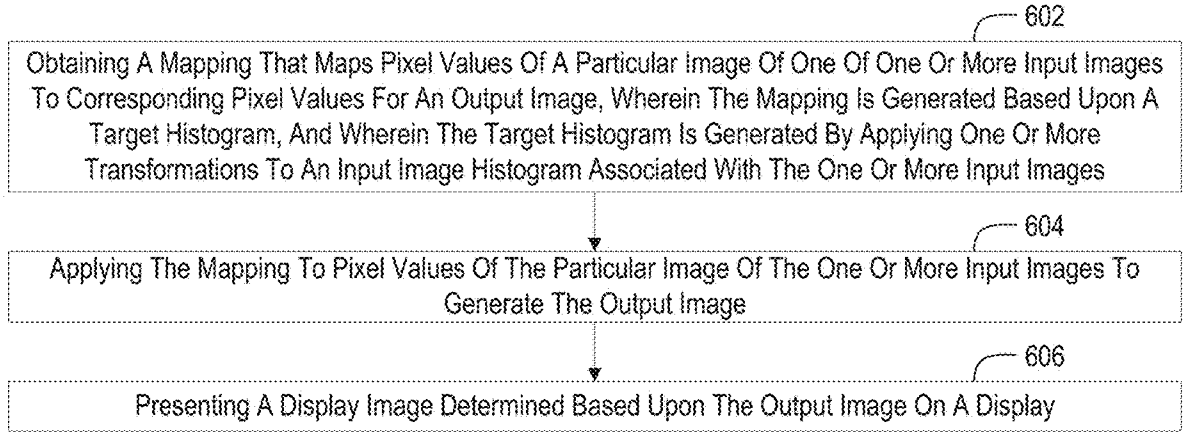

FIGS. 4, 5, and 6 illustrate example flow diagrams 400, 500, and 600, respectively, depicting acts associated with facilitating tone mapping via dynamic histogram matching, in accordance with implementations of the present disclosure.

Act 402 of flow diagram 400 of FIG. 4 includes generating an input image histogram based on one or more input images, the input image histogram comprising a plurality of bins, wherein each bin of the plurality of bins is associated with one or more pixel values and indicates a quantity of pixels that comprise the one or more pixel values. In some instances, the input image histogram is generated based on a plurality of image histograms associated with different images.

Act 404 of flow diagram 400 includes generating a target histogram based at least on the input image histogram. In some implementations, the target histogram is generated based on at least one additional target histogram. In some examples, generating the target histogram comprises applying one or more transformations to the input image histogram. In some instances, one or more aspects of the one or more transformations are determined based on one or more characteristics of the input image histogram. In some implementations, one or more aspects of the one or more transformations are determined by bin position in the input image histogram. In some examples, the one or more transformations comprise one or more smoothing operations. In some instances, the one or more smoothing operations comprise one or more Gaussian blur operations. In some implementations, the one or more smoothing operations comprise one or more box filtering operations.

Act 406 of flow diagram 400 includes generating an output image by using the target histogram to map pixel values of at least one of the one or more input images to corresponding pixel values in the output image. In some examples, generating the output image comprises performing histogram matching using the target histogram and the at least one of the one or more input images. In some instances, generating the output image comprises: (i) generating a first cumulative distribution function based on the at least one of the one or more input images; (ii) generating a second cumulative distribution function using the target histogram; (iii) generating a mapping based upon the first cumulative distribution function and the second cumulative distribution function; and (iv) applying the mapping to pixel values of the at least one of the one or more input images to generate the output image.

Act 408 of flow diagram 400 includes generating a second output image by using the target histogram to map pixel values of a different input image of the one or more input images to corresponding pixel values in the second output image.

Act 410 of flow diagram 400 includes presenting a display image determined based on the output image on a display. In some implementations, one or more acts of flow diagram 400 are performed by a system that comprises a display and/or one or more image sensors that capture the one or more input images.

Act 502 of flow diagram 500 of FIG. 5 includes accessing a target histogram generated by applying one or more transformations to an input image histogram associated with one or more input images.

Act 504 of flow diagram 500 includes generating a mapping based upon the target histogram that maps pixel values of at least one of the one or more input images to corresponding pixel values for an output image.

Act 506A of flow diagram 500 includes applying the mapping to pixel values of the at least one of the one or more input images to generate the output image.

Act 506B of flow diagram 500 includes conveying the mapping to a separate system to enable the separate system to apply the mapping to pixel values of the at least one of the one or more input images to generate the output image.

Act 602 of flow diagram 600 of FIG. 6 includes obtaining a mapping that maps pixel values of a particular image of one of one or more input images to corresponding pixel values for an output image, wherein the mapping is generated based upon a target histogram, and wherein the target histogram is generated by applying one or more transformations to an input image histogram associated with the one or more input images.

Act 604 of flow diagram 600 includes applying the mapping to pixel values of the particular image of the one or more input images to generate the output image.

Act 606 of flow diagram 600 includes presenting a display image determined based on the output image on a display. In some implementations, one or more acts of flow diagram 600 are performed by a system that comprises a display and/or one or more image sensors that capture the one or more input images.

Additional Details Related to the Disclosed Embodiments

Disclosed embodiments may comprise or utilize a special-purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry program code in the form of computer-executable instructions or data structures, and which can be accessed by a general-purpose or special-purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

As used herein, the term "about", when used to modify a numerical value or range, refers to any value within 5%, 10%, 15%, 20%, or 25% of the numerical value modified by the term "about".

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope

We claim:

1. A system for facilitating tone mapping, the system comprising:

one or more processors; and one or more hardware storage devices that store instructions that are executable by the one or more processors to configure the system to:

generate an input image histogram based on one or more input images, the input image histogram comprising a plurality of bins, wherein each bin of the plurality of bins is associated with one or more pixel values and indicates a quantity of pixels that comprise the one or more pixel values;

generate a target histogram based at least on the input image histogram by applying one or more smoothing operations to the input image histogram generated based on the one or more input images; and generate an output image by using the target histogram to map pixel values of at least one of the one or more input images to corresponding pixel values in the output image.

2. The system of claim 1, wherein the input image histogram is generated based on a plurality of image histograms associated with different images.

3. The system of claim 1, wherein the target histogram is generated based on at least one additional target histogram.

4. The system of claim 1, wherein the one or more smoothing operations comprise one or more Gaussian blur operations.

5. The system of claim 1, wherein the one or more smoothing operations comprise one or more box filtering operations.

6. The system of claim 1, wherein one or more aspects of the one or more smoothing operations are determined based upon one or more characteristics of the input image histogram.

7. The system of claim 1, wherein one or more aspects of the one or more smoothing operations are determined by bin position in the input image histogram.

8. The system of claim 1, wherein generating the output image comprises performing histogram matching using the target histogram and the at least one of the one or more input images.

9. The system of claim 1, wherein generating the output image comprises:

generating a first cumulative distribution function based on the at least one of the one or more input images;

generating a second cumulative distribution function using the target histogram;

generating a mapping based upon the first cumulative distribution function and the second cumulative distribution function; and applying the mapping to pixel values of the at least one of the one or more input images to generate the output image.

10. The system of claim 1, wherein the instructions are executable by the one or more processors to further configure the system to:

generate a second output image by using the target histogram to map pixel values of a different input image of the one or more input images to corresponding pixel values in the second output image.

11. The system of claim 1, wherein the system further comprises one or more image sensors that capture the one or more input images.

12. The system of claim 1, wherein the system further comprises a display, and wherein the instructions are executable by the one or more processors to further configure the system to present a display image determined based upon the output image on the display.

* * * * *